(12) United States Patent
Yates

(10) Patent No.: US 6,677,026 B1
(45) Date of Patent: Jan. 13, 2004

(54) CUSHION MATRIX

(76) Inventor: Paul M. Yates, 5814 Briar Tree, La Canada, CA (US) 91011

( * ) Notice: Subject to any disclaimer, the term of this patent is extended or adjusted under 35 U.S.C. 154(b) by 0 days.

(21) Appl. No.: 09/849,156

(22) Filed: May 4, 2001

(51) Int. Cl.⁷ .............. B32B 3/10; B32B 3/00; B32B 1/04; B32B 3/20; A47C 7/02
(52) U.S. Cl. .............. 428/137; 428/68; 428/76; 428/131; 428/188; 428/166; 428/43; 5/654; 5/655.5; 297/452.41; 297/452.42
(58) Field of Search .............. 5/654, 655.5; 428/68, 428/76, 131, 137, 188, 166, 43; 118/200; 297/452.41, 452.42

(56) References Cited

U.S. PATENT DOCUMENTS

| | | | | |
|---|---|---|---|---|
| 3,253,861 A | * | 5/1966 | Howard | 297/452.43 |
| 4,287,250 A | * | 9/1981 | Rudy | 428/166 |
| 5,194,315 A | * | 3/1993 | Itoh | 428/178 |
| 5,243,722 A | * | 9/1993 | Gusakov | 5/455 |
| 5,590,430 A | * | 1/1997 | Sereboff | 5/655.5 |
| 5,591,263 A | * | 1/1997 | Chin et al. | 118/200 |
| 5,638,565 A | * | 6/1997 | Pekar | 5/710 |
| 5,679,193 A | | 10/1997 | Yates | 156/145 |
| 5,756,184 A | | 5/1998 | Yates | 428/188 |
| 5,932,046 A | | 8/1999 | Yates | 156/145 |
| 5,993,584 A | | 11/1999 | Yates | 156/145 |
| 5,997,971 A | * | 12/1999 | Navarro | 428/43 |
| 6,017,407 A | | 1/2000 | Yates | 156/221 |
| 6,027,674 A | | 2/2000 | Yates | 264/113 |
| 6,048,602 A | | 4/2000 | Yates | 428/188 |
| 6,050,964 A | | 4/2000 | Yates | 602/5 |
| 6,082,683 A | | 7/2000 | Yates | 248/118.1 |
| 6,089,516 A | * | 7/2000 | Yates | 248/118 |
| 6,117,259 A | | 9/2000 | Yates | 156/145 |
| 6,206,474 B1 | * | 3/2001 | Kruse et al. | 297/452.41 |
| 6,219,867 B1 | * | 4/2001 | Yates | 5/655.5 |
| 6,226,820 B1 | * | 5/2001 | Navarro | 5/655.5 |

* cited by examiner

*Primary Examiner*—Harold Pyon
*Assistant Examiner*—Catherine A. Simone
(74) *Attorney, Agent, or Firm*—Walter A. Hackler

(57) ABSTRACT

A resilient cushion includes a base sheet and a cover sheet sealed to the base sheet along spaced apart strips to form a matrix of sac like areas therebetween. A gel fills each of the sac like areas and a plurality of openings through the base and cover sheets along the strips are provided for enabling the passage of a fluid therethrough. The resilient cushion may include sac like areas disposed on both sides of a base layer and the use of gels of different resiliency may be utilized to provide a tailoring of overall cushioning resiliency.

11 Claims, 1 Drawing Sheet

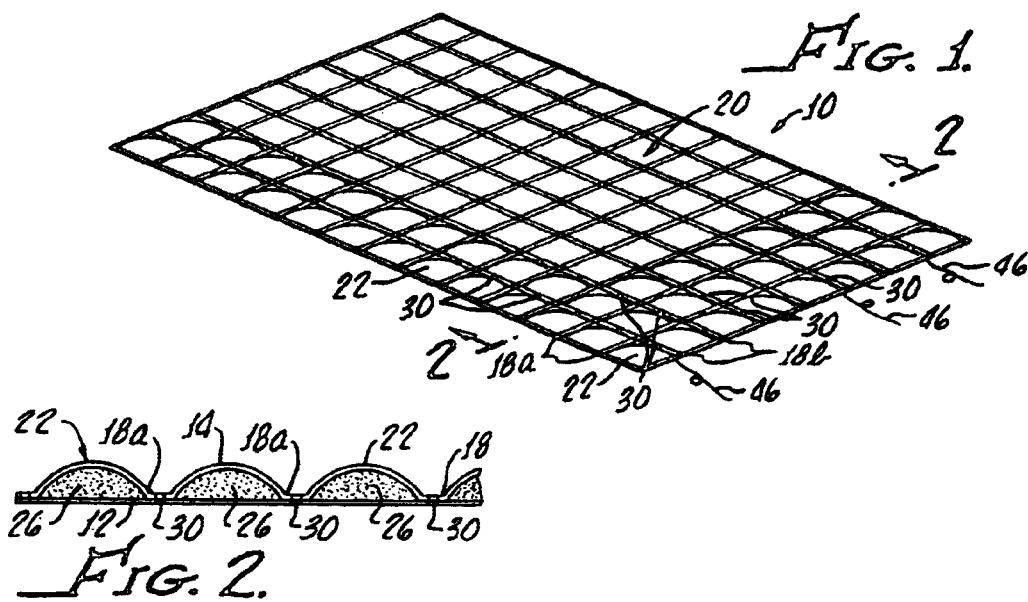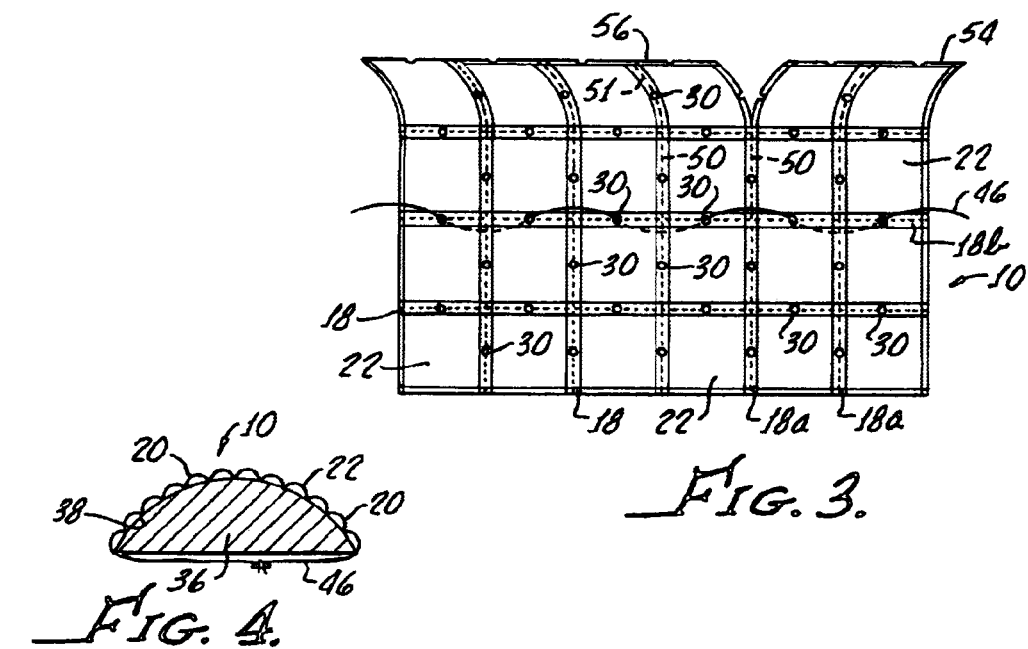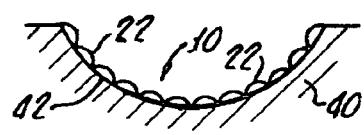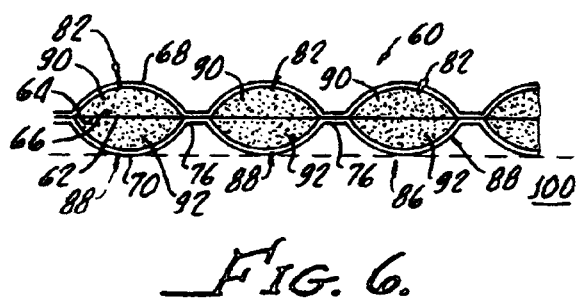

CUSHION MATRIX

The present invention generally relates to cushions, and more particularly, directed to cushioning devices having resilient sacs or chambers filled with a gel.

Cushioning devices are used in many shock absorbing applications including support devices, packaging devices, clothing and padding to name a few.

Cellular type cushioning, padding or packaging devices have been heretofore made by heat sealing air containing chambers between plastic sheets. Such cushions however, are unsuitable in many applications. As a specific example, use in aircraft is impractical because of the change in pressure. Heavy compressive loads have not been supported by prior art devices because of the fragile nature of the material and marginal strength of the seals.

In addition, prior art devices have not enabled the easy securing of the cushions to an object nor enabled the cushioning device to be separable for modifying the size thereof to accommodate specific situations.

The present invention provides an improved gel filled cell type cushioning device which can be made from high strength, fatigue resistant elastomeric gels having sufficient stability to provide consistent resiliency for a wide range of applications.

SUMMARY OF THE INVENTION

A resilient cushion in accordance with the present invention generally includes a base sheet and a cover sheet sealed to the base sheet along spaced apart strips to form a matrix of sac like areas therebetween.

The sacs are filled with a gel and preferably a plurality of openings through the base and cover sheets along the strips are provided for enabling passage of a fluid therethrough. With the openings, the cushion in accordance with the present invention may be utilized in situations where breathing of a contacted object is desirable.

The cover sheet is sealed to the base sheet along the strips which may intersect one another at right angles.

Preferably, the base sheet is flexible for enabling the cushion to conform to a contoured surface by bending along the strips.

In addition, perforations may be provided in the strips for facilitating separation of the cushions into a plurality of smaller cushions or tailoring the cushion size to a specific area.

At least one cord may be provided and interlaced between adjacent openings in the strip for enabling the cushion to be secured to an object. The strips may also be of sufficient width for enabling the cushion to be applied to a concave surface with the sac like areas converging toward one another.

In one embodiment of the present invention, a first cover sheet may be sealed to the base sheet on a first side thereof along spaced apart first strips to form a matrix of first sac areas there between. A second cover sheet may be sealed to the base sheet on the second side thereof along spaced apart second strips to form a matrix of second sac like areas therebetween. A gel fills each of the first and second sac like areas.

Preferably, the first and second strips are aligned with one another for enabling a plurality of openings through the first and second strips and the base and cover sheets to provide a breathing of the cushion. The first and second strips also preferably intersect one another at right angles and preferably the base sheet is flexible for enabling the cushion to conform to a contoured surface by bending along the first and second strips. In addition, perforations may be provided in the first and second strips for facilitating separation of the cushion into a plurality of smaller cushions or to size the cushions to a particular area or application. At least one cord may be interlaced between adjacent openings for enabling the cushion to remain secure to an object.

BRIEF DESCRIPTION OF THE DRAWINGS

The present invention may be more clearly understood with reference to the following detailed description in conjunction with the appended drawings of which:

FIG. 1 is perspective view of a resilient cushion in accordance with the present invention generally showing a base sheet having a matrix of spaced apart cushion islands, or sacs, formed on the base sheet with each cushion island including a cover sealed to the base sheet and confining a gel between the cover and the base sheet along with cords for enabling the cushion to be secured to an object, not shown;

FIG. 2 is a cross-sectional view taken along the line to 2 of FIG. 1 of the cushion showing individual islands or sacs defined by a cover sheet sealed to a base sheet along strips and having a plurality of holes through the strips for enabling the passage of a fluid, such as air or liquid therethrough;

FIG. 3 is a plan view of the cushion shown in FIG. 1 more clearly illustrating strips between the cushion islands or sacs, showing holes or, openings in the strips along with perforations for enabling the separation of the cushion and a cord interlaced through adjacent holds;

FIG. 4 illustrates positioning of the cushion shown in FIG. 1 on a convex surface;

FIG. 5 illustrates positioning of the cushion shown in FIG. 1 on a concave surface; and FIG. 6 is a cross-sectional view of an alternative embodiment of the present invention utilizing two cover sheets and a base sheet and forming cushion islands, or cells, on either side of the base sheet.

DETAILED DESCRIPTION

With reference to FIGS. 1, 2 and 3, there is shown a resilient cushion 10 in accordance with the present invention which generally includes a base sheet 12 and a cover sheet 14 sealed to the base 12 along spaced apart strips 18a, 18b (referred to generally as 18 herein) to form a matrix of spaced apart sac like areas, or islands, or cells, 22 therebetween. A gel, shown in cross-section in FIG. 2, fills each of the sac like areas 22 to provide the mounded structure shown in FIGS. 1 and 2. It should be appreciated that the term gel as used herein means any gel-like material having the resilient qualities of a gel whether or not the gel-like material is considered by way of chemical or physical description to be a true gel.

Fabrication of the cushion may be made in accordance with U.S. Pat. Nos. 5,679,193, 5,756,184, 5,932,046, 5,993, 584, 6,017,407, 6,048,602, 6,050,964, 6,082,683 and 6,117, 259 to Yates. All of these patents are to be incorporated therewith by this specific reference thereto including all specification and drawings for the purpose of teaching a method for manufacturing the present invention.

Suitable gels for use in the present invention are set forth in U.S. Pat. No. 6,027,674 to Yates and this reference is to be incorporated herewith in its entirety by this specific reference thereto for teaching suitable gels.

The base sheet 12 and cover sheet 14 may be any suitable sheet material capable of being sealed to one another for encapsulating the gel 26 therebetween. For example, the sealing may be heat or sonic energy. Because the gel is utilized in the present invention instead of the prior art use of a gas such as air, the permeability of the base sheet 12 and cover sheet 14 need not prevent the passage of air or gas therethrough. A plurality of holes 30 in the strips 18 between the sacs 22 are provided for enabling fluids, such as gases or liquids to pass therethrough, thus, the cushion 10 may be applied to surfaces, such as a human body which desirably need ventilation, such ventilation enabling evaporation of liquids through the cushion 10. The holes 30 in the strips are sealed thereabout in the strips to isolate the gel and prevent gel leakage thereinto or therethrough.

While other geometric layouts are possible, it is preferred that the strips 18 intersect each other at right angles as shown in FIG. 3 in order to provide rectilinear adjustment of this size of the cushion 10 as will be hereinabove described in greater detail.

The base sheet 12 is preferably flexible for enabling the cushion 10 to conform to a contoured object 36 having a convex surface 38 as shown in FIG. 4 or an object 40 having a concave surface 42 as shown in FIG. 5. In that regard, the strips 18a, 18b have sufficient width for enabling the cushion 10 to be applied to the concave surface 42 with the sac like areas 22 converging toward one another. The radius of curvature, of course, being dependant upon the height of the cells 22 and the width of the strips 18.

As shown in FIGS. 1 and 2, the holes 30 also enable the use of one or more cords 46 to be interwoven, or interlaced between adjacent holes 30 to provide a means for attaching the cushion 10 to an object 36. Alternatively, as shown in FIG. 5, the cushion may be glued or otherwise heat sealed to the surface 42 of the object 40.

As best shown in FIG. 3, perforations 50 may be provided in the strips 18 to facilitate separation of the cushion 10 as shown into separate cushions 54, 56. Thus, the cushion 10 may provide for a multiplicity of cushions 54, 56, or be sized to accommodate a specific area, such as for example, presented by the convex surface shown in FIG. 4 and the concave surface 42 shown in FIG. 5.

An alternative embodiment cushion 60 in accordance with the present invention is shown in FIG. 6 which generally includes a base sheet 62 having a first side 64 and a second side 66 along with first and second cover sheets 68, 70 secured to the first and second sides of the 64, 66 of the base sheet 62 along strips 76 for defining a first matrix 80 of sac like areas 82 between the strips 76 on the first.

Each of the sacs, or cells 82 include a gel 90 and each of the sacs or cells 88 include a gel 92.

To accommodate for various resiliency requirements, the gels 90, 92 may have different resiliency.

Different resiliencies may be obtained from the utilization of different gels or a chemically similar gels with a variation in the components present. Such variations are set forth in the hereinabove referenced U.S. Pat. No. 6,027,674.

Accordingly, if placed on a surface 100 indicated by dashed line in FIG. 6, the cushion 60 may include a stiffer gel 92 facing the surface than the gel 90 in cells 82 positioned for receiving a load. Thus, the cushion 60 can provide a relatively soft feeling to a body portion or other object (not shown), while at the same time providing a firm support though the stiffer gel 92, disposed in the cells 88.

Although there has been hereinabove described a resilient cushion in accordance with the present invention for the purpose of illustrating the manner in which the invention may be used to advantage, it will be appreciate that the invention is not limited thereto. Accordingly, any and all modifications, variations, or equivalent arrangements which may occur to those skilled in the art should be considered to be within the scope of the invention as defined in the appended claims.

What is claimed is:

1. A resilient cushion comprising:
  a base sheet having a first and a second side;
  a first cover sheet sealed to the base sheet first side along spaced apart first strips to form a matrix of first cells therebetween;
  a second cover sheet sealed to the base sheet second side along spaced apart second strips to form a matrix of second cells therebetween;
  a first gel disposed in each of the first cells;
  a second gel disposed in each of the second cells; the first and second gels having different resiliencies; and
  a plurality of opening through the first and second strips and base and cover sheets.

2. The cushion according to claim 1 wherein the first and second strips intersect one another at right angles.

3. The cushion according to claim 2 wherein said base sheet is flexible for enabling the cushion to conform to a contoured surface by bending along the first and second strips.

4. The cushion according to claim 3 further comprising perforations in the first and second strips for facilitating separation of the cushions into a plurality of smaller cushions.

5. The cushion according to claim 4 further comprising at least one cord interlaced between adjacent openings for enabling the cushion to be secured to an object.

6. A resilient cushion comprising:
  a base sheet having a first and a second side;
  a first matrix of spaced apart cushion islands formed on the base sheet, first side, each cushion island including a cover sealed to said base sheet and confining a first gel between each cover and said base sheet;
  a second matrix of spaced apart cushion islands formed on the base sheet second side, each cushion island including a cover sealed to said base sheet and conforming a second gel between each cover and said base sheet; the first and second gel having different resiliencies; and
  a plurality of holes through the base and cover sheets between the cushions islands.

7. The cushion according to claim 6 wherein the base sheet and covers are sealed along strips between the cushion islands and the holes extend through said strips.

8. The cushion according to claim 7 wherein said strips intersect one another at right angles.

9. The cushion according to claim 8 wherein each cover is heat sealed to said base sheet along the strips.

10. The cushion according to claim 9 wherein said base sheet is flexible for enabling the cushion to conform to a contoured surface by bending along the strips.

11. The cushion according to claim 10 further comprising perforations in the strips for facilitating separation of the cushion into a plurality of smaller cushions.

* * * * *